US012811938B2

(12) United States Patent
Southgate et al.

(10) Patent No.: US 12,811,938 B2
(45) Date of Patent: Nov. 24, 2026

(54) LARGE LANGUAGE MODEL-BASED AUTHENTICATION

(71) Applicant: CrowdStrike, Inc., Sunnyvale, CA (US)

(72) Inventors: Andrew Southgate, Cambridge (GB); Paul Sumedrea, Bucharest (RO); Cristian Viorel Popa, Bucharest (RO); Dragos Georgian Corlatescu, Bucharest (RO)

(73) Assignee: CrowdStrike, Inc., Sunnyvale, CA (US)

(*) Notice: Subject to any disclaimer, the term of this patent is extended or adjusted under 35 U.S.C. 154(b) by 159 days.

(21) Appl. No.: 18/478,006

(22) Filed: Sep. 29, 2023

(65) Prior Publication Data

US 2024/0146734 A1 May 2, 2024

Related U.S. Application Data

(60) Provisional application No. 62/524,496, filed on Jun. 30, 2023.

(51) Int. Cl.
*H04L 9/40* (2022.01)
*G06F 21/62* (2013.01)
*G06N 5/02* (2023.01)

(52) U.S. Cl.
CPC .......... *H04L 63/10* (2013.01); *G06F 21/6227* (2013.01); *G06N 5/02* (2013.01); *H04L 63/08* (2013.01)

(58) Field of Classification Search
CPC ..... H04L 63/10; H04L 63/08; G06F 21/6227; G06N 5/02; G06N 5/022; G06N 20/00
See application file for complete search history.

(56) References Cited

U.S. PATENT DOCUMENTS

| | | | | |
|---|---|---|---|---|
| 11,238,148 | B2 * | 2/2022 | Bhattacharyya | G06F 21/36 |
| 11,405,379 | B1 * | 8/2022 | Clauss | H04L 63/101 |
| 2003/0012384 | A1 * | 1/2003 | Vicard | G06Q 30/02 380/277 |
| 2014/0282942 | A1 * | 9/2014 | Berkman | H04L 63/0407 726/6 |
| 2016/0300049 | A1 * | 10/2016 | Guedalia | G06V 30/1985 |
| 2019/0295082 | A1 * | 9/2019 | Telem | G06Q 20/354 |
| 2023/0274094 | A1 * | 8/2023 | Tunstall-Pedoe | G06F 40/30 704/9 |
| 2024/0333699 | A1 * | 10/2024 | Narendranathan | G06F 40/40 |

* cited by examiner

*Primary Examiner* — Christopher B Robinson
*Assistant Examiner* — Tania M Pena-Santana
(74) *Attorney, Agent, or Firm* — Womble Bond Dickinson (US) LLP

(57) ABSTRACT

Systems and methods of authentication utilizing a large language model (LLM) are provided. The method includes accessing a knowledge base comprising user-specific data of a user device associated with a domain. In response to a request from the user device for access to a resource of the domain, the method includes generating one or more authentication challenges based on the user-specific data. The one or more authentication challenges are generated by an LLM trained on the user-specific data and contextual interactions associated with the user device. In response to determining that a response to the one or more authentication challenges matches the user-specific data of the knowledge base and the contextual interactions, the method includes providing the user device access to the resource of the domain.

20 Claims, 4 Drawing Sheets

LARGE LANGUAGE MODEL-BASED AUTHENTICATION

CROSS REFERENCE TO RELATED APPLICATION

This application claims the benefit of and priority to U.S. Provisional Application No. 63/524,496, entitled "LARGE LANGUAGE MODEL-BASED AUTHENTICATION" and filed on Jun. 30, 2023, which is expressly incorporated by reference herein in its entirety.

TECHNICAL FIELD

Aspects of the present disclosure relate to large language models (LLMs), and more particularly, to LLMs used for authentication.

BACKGROUND

Large language models are designed to understand and generate coherent and contextually relevant text. Large language models are typically built using deep learning techniques using a neural network architecture and are trained on substantial amounts of text data for learning to generate responses. The training process for large language models involves exposing the model to vast quantities of text from various sources, such as books, articles, websites, and other data.

Large language models use tokens as fundamental units into which text is divided for processing. Tokens are usually smaller units of text, such as individual characters, sub words (e.g., byte-pair encoding), or words. Large language models tokenize queries and general text documentation as part of its input processing, which enables large language models to manage large volumes of general text documentation efficiently. By breaking the text into tokens and representing text numerically, large language models can understand and generate responses based on the underlying patterns and relationships within the text.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
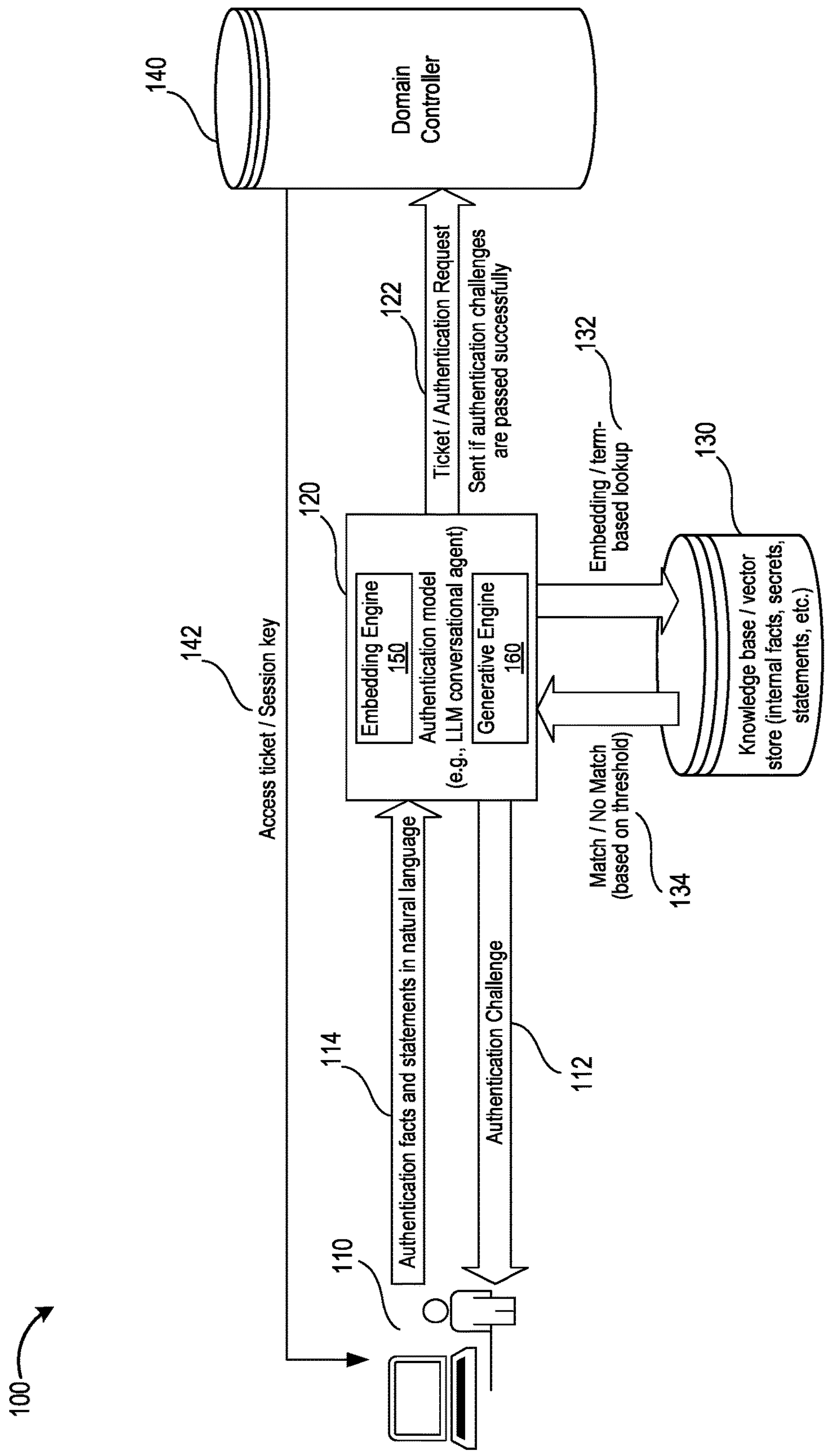
FIG. 1 is a block diagram that illustrates an example system for using a large language model (LLM) for resource authentication, in accordance with some embodiments of the present disclosure.

As discussed above, a large language model (LLM) tokenizes queries and general text documentation as part of its input processing to facilitate efficient processing and analysis. In some embodiments, an LLM may be able to recognize synonyms in text based on prior processing. As described herein, the properties associated with LLMs may be leveraged to assist in access control. Access control includes identification, authorization, authentication, access approval, and audit. Authentication and access control may be combined into a single operation, so that access is approved based on successful authentication, or based on an anonymous access token.

Access control may identify users by verifying various login credentials, which can include usernames and passwords, personal identification numbers (PINs), biometric scans, and security tokens. Many access control systems also include multifactor authentication (MFA), which is a technique that requires multiple authentication methods to verify a user's identity. MFA provides an additional layer of security/defense, making it harder for adversaries to gain access to assets and confidential information for malicious purposes.

Currently, numerous multi-factor authentication tools exist, either at the hardware or software level. In order to authenticate, user devices may utilize a particular device or security key at their disposal which they keep safe in all circumstances or risk it being stolen. However, no authentication method is perfect on its own. The more complicated an authentication method is, the more prone end users are to weaken the authentication method unknowingly (e.g., password vaults containing hard to remember passwords can be cracked due to having a weak master password). Making authentication too easy, at the same time, has the downside of potentially exposing the end user to identity theft (e.g., if any form of biometric identifier (ID) is copied by an attacker through various means) or even to physical harm (e.g., hardware tokens can be looted, sometimes through violent means if kept at hand at all times).

The present disclosure addresses the above-noted and other deficiencies by providing an LLM configured to be trained on data associated with and/or specific to particular user devices. The data may include information related to projects the user is working on, interactions the user has had via online discussion groups and/or email, user/device characteristics, and the like. The LLM may be configured to utilize this data to employ generative engines that generate challenges containing information likely only known to the user. The challenges may include multiple, conversational interactions, the responses to which may be analyzed by the LLM to determine if the user is who the user claims to be. In response to authenticating the user, the LLM may initiate procedures to authenticate the user device and allow the user device access to controlled resources.

Embodiments of the present disclosure may strike a balance between complexity and simplicity by integrating the LLM-based authentication system into everyday usage patterns. During a user's day-to-day activities, the user may regularly interrogate internal systems or engage with various coworkers in order to fulfill the work duties of the user. Often, these interactions are done via text and contain various facts and verbiage only particular users are aware of given their job duties. Embodiments of the present disclosure may integrate authentication into these everyday workflows by having users converse with an intelligent authentication agent based on LLMs. The agent is responsible for keeping user devices authenticated during the user's job duties and can intervene during key moments in order to engage in a conversation meant to validate the legitimacy of the users of the system by having the users share various pre-known facts. This system could, for instance, be used both to renew/invalidate an existing MFA token obtained through some other medium as well as be used to grant access to a particular internal system the user device has not been previously assigned to use. This method can also help authenticate users which have different accounts pertaining to different roles they have across the organization and match them to the same user based on the responses they give throughout the authentication process.

As discussed herein, the present disclosure provides an approach that improves the operation of a computer system by increasing the security of access control. Embodiments of the present disclosure may reduce a risk that a user device's authentication tokens are compromised, and may harden a computer system against attack. As previously described, some authentication techniques are either hard to use (thus lending themselves to shortcuts which undermine their utility) or too simple to abuse (e.g., through MFA fatigue attacks), sometimes even putting the end user directly at risk (e.g., of looting, physical harm, identity theft). Embodiments of the present disclosure may strike a balance between system complexity and ease of use while providing continuous authentication and re-authentication with minimal impact for the end user.

FIG. 1 is a block diagram that illustrates an example system 100 utilizing a machine learning (ML) model, such as an LLM, for resource authentication, in accordance with some embodiments of the present disclosure. Although this disclosure often refers to an LLM or LLMs, various other machine learning models may be used in addition to, or instead of, an LLM or LLMs. FIG. 1 illustrates a scenario in which a user device 110 attempts to gain access to resources maintained by a domain controller 140. The scenario of FIG. 1 is merely an example, and is not intended to limit the embodiments of the present disclosure. The embodiments of FIG. 1 could similarly be utilized in other authentication scenarios, such as system logins, database access, storage access, server authentication, and the like. It will be understood that other authentication scenarios utilizing the LLM 120 are possible without deviating from the embodiments of the present disclosure.

Referring to FIG. 1, the user device 110 may attempt to access the domain controller 140. This may be, for example, in response to an online (e.g., networked) access request to the domain controller 140, or to a resource controlled by the domain controller 140. For example, the user device 110 may attempt to access a server or server resource, and the server may direct the user device 110 to the domain controller 140.

The domain controller 140 may defer at least a portion of an authentication process in response to the request to an authentication model 120. The authentication model 120 may include an LLM including a conversational agent. The authentication model 120 implements the LLM conversational agent and, as such, can generate, in a natural language format, one or more authentication challenge questions 112 for the user device 110 to authenticate. The conversational agent may be trained on one or more internal vector store/knowledge bases 130 composed of various internal facts, secrets, statements, etc., likely not disclosed outside a particular organization. In some embodiments, these knowledge bases 130 may be constructed by each team internally and may be used for direct fact retrieval via embeddings by a conversational agent capable of querying the knowledge base 130 where these facts are stored, or as a fine-tuning corpus for training a conversational agent specifically for authentication enabling conversations.

In some embodiments, the authentication model 120 may be trained on data that is generated as part of the normal operations of the user device 110 within the system 100. For example, a knowledge base 130 may be constructed of data associated with the activities of the user device 110, including email that is received/sent, online discussion postings, reports generated, code written, and the like. In addition to the data generated, information may be captured on characteristics of the data and/or the circumstances under which the data is generated. For example, data may be collected for the user device 110 related to average response time, average response length, number of spelling mistakes, various stopword patterns, and the like. The data and/or the training of the authentication model 120 may not be limited to a single user device 110, but may contain data on all or several user devices that may request access to the domain controller 140.

The authentication model 120 may be trained on vast amounts of text data of the knowledge base 130 using unsupervised learning techniques. During the training process, the authentication model 120 may learn to predict the next word in a sentence based on the context provided by the preceding words. This process enables the authentication model 120 to develop a rich understanding of the relationships between words and the contextual nuances of language.

The authentication model 120 may include an embedding engine 150 and a generative engine 160. The generative engine 160 can be implemented as an LLM that generates, in a natural language format, one or more authentication challenge questions 112 for the user device 110 to authenticate. The embedding engine 150 may be utilized to generate embeddings for words, sentences, or documents included in the knowledge base 130. Embedding may refer to the process of taking any data element, such as a text-string, an image, an audio snippet, and the like, and producing a vector of numbers for the data element. In other words, the original data element is "embedded" into the new multi-dimensional (embedding) space. The authentication model 120 may contain a learned embedding component illustrated as the embedding engine 150 in FIG. 1. Thus, the authentication model 120 may be used to identify an embedding vector (also referred to herein as an "embedding"). The generated vectors are not random/arbitrary but, instead, the points associated with an embedding represented in the multi-dimensional space are close if the entities are similar and/or related.

The embeddings for a given input are numerical representations that encode semantic and syntactic properties of the language represented by the input. The embeddings may be high-dimensional vectors, where the dimensions capture different aspects of the language. The embeddings produced by the embedding engine 150 of the authentication model 120 may have several desirable properties. First, the embeddings may capture semantic similarity, meaning that similar words or phrases are represented by vectors that are close to each other in the embedding space. For example, the embeddings of "dog" and "cat" would be closer together than the embeddings of "dog" and "car." This property allows for tasks like word similarity measurement or finding related words based on the vectors of the embedding.

Second, the embeddings may capture contextual information. Since the authentication model 120 is trained on vast amounts of text, the authentication model 120 may programmatically learn to understand the meaning of words based on their surrounding context. This enables the embeddings to reflect the meaning of a word within a specific sentence or document. Furthermore, the authentication model 120 may generate sentence embeddings or document embeddings by aggregating the embeddings of individual words. This allows for understanding the overall meaning and semantic compositionality of longer text units.

The authentication model 120 may generate an embedding for each of the data associated with the user device 110 and store the results in the knowledge base 130. The knowledge base 130 may include embeddings (e.g., multi-dimensional vectors) that describe and/or characterize each of the data listings associated with the user device 110.

The authentication model 120 may also include a generative engine 160. The generative engine 160 portion of the authentication model 120 may be capable of generating coherent and contextually relevant text based on the knowledge base 130 generated as part of the training of the authentication model 120.

In some embodiments, the generative engine 160 may employ a transformer architecture that enables the generative engine 160 to capture complex language patterns and generate highly realistic and human-like text. As part of generating text, the generative engine 160 may operate by taking an initial prompt or seed text and then producing a continuation based on the learned language patterns represented by the model (e.g., stored in the knowledge base 130). The generative engine 160 considers the context provided by the seed text and generates a sequence of words that are coherent and contextually appropriate. The generated text can be as short as a single word or as long as multiple paragraphs. As will be described further herein, the generative engine 160 may be utilized to authenticate the request from the user device 110 based on knowledge stored in the knowledge base 130 about the user device 110.

Referring still to FIG. 1, in response to the attempt from the user device 110 to authenticate with the domain controller 140, the authentication model 120 may generate an authentication challenge 112 for the user device 110. In some embodiments, the authentication challenge 112 may be generated by the generative engine 160.

The authentication challenge 112 may be a natural language query that requests a response from the user device 110. In some embodiments, the authentication challenge 112 may be formed based on information about the user device 110 determined from the knowledge base 130. For example, the authentication challenge 112 may ask a user of the user device 110 to describe a current project that the user is working on (e.g., "What is the code name of the project that you are working on with Bob?"). As another example, the authentication challenge 112 may query for information related to a recent email or discussion participated in with the user device 110 (e.g., "On Thursday, who did you email regarding the marketing proposal?"). As another example, the authentication challenge 112 may query for information related to recent work product of the user (e.g., "What module did you insert into the codebase last Wednesday?")

In response to the authentication challenge 112, the user device 110 may provide a response 114. The response 114 may include authentication facts and/or statements from the user device 110 in a natural language format. For example, when the authentication challenge 112 is: "On Thursday, who did you email regarding the marketing proposal?", the user of the user device 110 might respond in a natural language format with: "On Thursday, I emailed Bob regarding my marketing proposal."

The authentication model 120 may be configured to receive the response 114 and compare the response 114 to the knowledge base 130 to determine if the response 114 is authentic. For example, the embedding engine 150 may generate an embedding from the response 114 and perform an embedding and/or term-based lookup 132 within the knowledge base 130. In some embodiments, the authentication model 120 may be configured to identify nearest neighbors to the embedding generated from the response 114 that are within the knowledge base 130. For example, the embedding may be compared to the embeddings generated by the embedding engine 150 with respect to other data from the user device 110 that is within the knowledge base 130 to determine whether other embeddings associated with the response 114 are nearest to data of the knowledge base 130 that was utilized to generate the authentication challenge 112. As each of the embeddings may be represented as vectors in a multi-dimensional space, nearness may be calculated based on the coordinates of the vectors.

In some embodiments, in response to the embedding/term-based lookup 132, it may be determined (e.g., based on a threshold level of confidence) whether there is a match or no match for user authentication with respect to data stored in the knowledge base 130. In some embodiments, a match may be indicated 134 if the embedding generated from the response 114 is within a threshold distance of embedding associated with the user within the knowledge base 130. In some embodiments, the indication 134 of whether there is a match (or not a match) within the knowledge base 130 is returned to the authentication model 120.

Though only a single authentication challenge 112 is illustrated in FIG. 1, it will be understood that multiple authentication challenges 112 may be provided. For example, in some embodiments, the authentication challenge 112 may be a conversation, in which multiple prompts and queries are provided to the user device 110, each of which are validated by the authentication model 120. In some embodiments, to determine whether there is a match, the user device 110 must successfully respond 114 to a plurality of authentication challenges 112.

One advantage of having the embedding/term based lookup 132 for various facts and statements within the knowledge base 130 is represented by the fact that the user does not need to remember word by word what the answer to a particular question is, but can instead formulate an answer in natural language to the best of their abilities and that answer will be embedded using the embedding engine 150 of the authentication model 120 (e.g. a sentence transformer or any other kind of neural network). The resulting embedding can be compared with an indexed set of facts within the knowledge base 130 which are themselves embedded. The knowledge base 130 may be queried such that, based on a similarity metric, a particular response 114 from the user device 110 can be matched with a known fact (e.g., without having to worry about precise formulation or exact spelling/capitalization).

In addition, the authentication model 120 may be given context around the way the user talks and/or communicates. This can be, for example, achieved by using an external model or directly surfacing to the authentication model 120 observed particularities around statistical features typical to the user utilizing authentication such as average response time, average response length, number of spelling mistakes, various stopword patterns, and the like. This will help the authentication model 120 detect if the user device 110 engages in interactions that deviate too much from how the user usually behaves.

As an example, the authentication model 120 may include an anomaly detection component that may be configured to detect anomalies in interactions with a given user device 110 in scenarios in which an attacker knows information about the targeted user (e.g., a coworker that has malicious intent and factual knowledge about the user). By engaging in a longer conversation (e.g., 10-20 interactions) with the authentication model 120 utilizing chat generation for the authentication challenges 112, the anomaly detection component may determine that an anomaly is present by examining the observed context associated with the user device 110 and/or the statistical features typical to the user described herein. The functionality of the anomaly detection component could be carried out by the authentication model 120 itself, but the embodiments of the present disclosure are not limited to such a configuration. In some embodiments, a specialized model may be generated for the task of anomaly detection. Such a model could be neural-network based (e.g. an autoencoder) or could be based on isolation forest or support vector machines (SVM). For efficiency, in case the authentication model 120 is the sole model being used for this purpose, this context can be provided using prompt tuning as the context may slightly change after each session. The context associated with the user can also be extracted using the same authentication model 120 by synthesizing the prior description along with the new interactions.

In response to the knowledge base 130 indicating 134 that a match is not present, the authentication model 120 may deny the user device 110 access to the domain controller 140. In some embodiments, the authentication model 120 may send an explicit indication to the domain controller 140 denying the user device 110 access to the domain controller 140. In other embodiments, the authentication model 120 may withhold a ticket/authentication request 122 from the domain controller 140 to deny the user device 110 access to the domain controller 140.

In response to the knowledge base 130 indicating 134 that a match is present between the response 114 and the data of the knowledge base 130 associated with the user, the authentication model 120 may generate a ticket/authentication request 122 for the domain controller 140. The ticket/authentication request 122 is sent to the domain controller 140 if the authentication challenge(s) 112 presented to the user device 110 have been successfully passed and may indicate the same to the domain controller 140.

In response to the ticket/authentication request 122, the domain controller 140 may transmit an access ticket/session key 142 to the user device 110. The access ticket/session key 142 may allow the user device 110 to access one or more computing resource controlled by the domain controller 140.

In some embodiments, the procedure of FIG. 1 may be repeated for different access requests by the user device 110. For example, different domains may have different domain controllers 140 and/or different knowledge bases 130. Thus, a successful response 114 from the user device 110 in one domain may be unsuccessful in another domain, depending on the data collected in the corresponding knowledge base 130.

In some embodiments, the system 100 may not be the sole authentication system of the domain controller 140, and may instead be used to augment another authentication system. For example, the LLM-based authentication system 100 utilizing the authentication model 120 may be a secondary (or primary) authentication method provided as part of a MFA process that utilizes other authentication schemes such as a password, security key, or other methodology.

Figure 2:
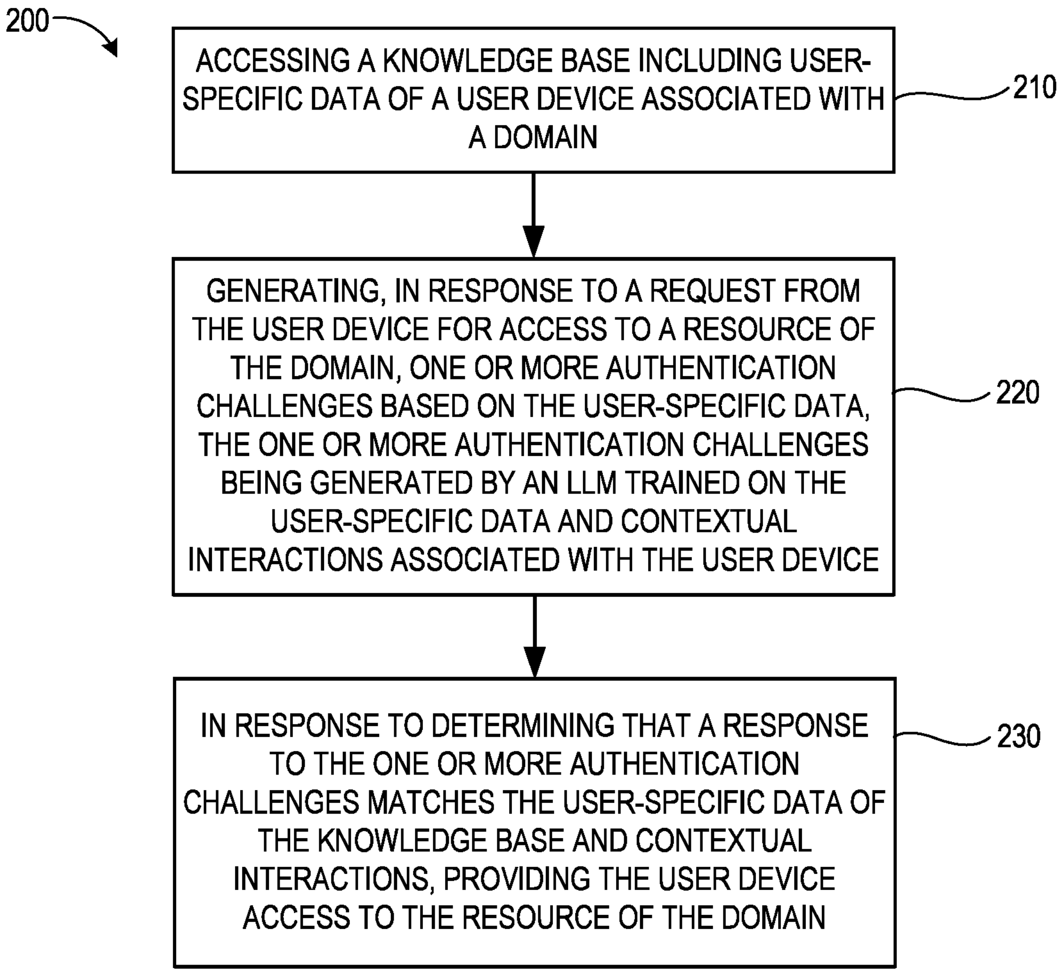
FIG. 2 is a flow diagram of a method for authentication utilizing an LLM, in accordance with some embodiments of the present disclosure.

FIG. 2 is a flow diagram of a method 200 for authentication utilizing an LLM, in accordance with some embodiments of the present disclosure. A description of elements of FIG. 2 that have been previously described will be omitted for brevity. Method 200 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 200 may be performed by processing device 302 shown in FIG. 3.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 have to be performed.

With reference to FIG. 2, method 200 begins at block 210, whereupon processing logic is accessing a knowledge base including user-specific data of a user device associated with a domain. In some embodiments, the knowledge base may be similar to the knowledge base 130 described herein with respect to FIG. 1. In some embodiments, the user device may be similar to the user device 110 described herein with respect to FIG. 1.

At block 220, the processing logic is generating, in response to a request from the user device for access to a resource of the domain, one or more authentication challenges based on the user-specific data and contextual interactions associated with the user device. The one or more authentication challenges are generated by the generative engine 160 (e.g., an LLM trained on the user-specific data and the contextual interactions). In some embodiments, the one or more authentication challenges may be similar to the authentication challenge 112 described herein with respect to FIG. 1. In some embodiments, the LLM may be the same, similar to, and/or implemented by the authentication model 120 described herein with respect to FIG. 1. For example, the generative engine 160 of the authentication model 120 can be implemented as an LLM conversational agent that generates the one or more authentication challenges 112.

At block 230, the processing logic, in response to determining that a response to the one or more authentication challenges matches the user-specific data of the knowledge base 130 and the contextual interactions, is providing the user device access to the resource of the domain. For example, the authentication model 120 may send an explicit indication to the domain controller 140 controlling access to the resources of the domain, such as sending a ticket/authentication request 122 to the domain controller. In some embodiments, the response to the one or more authentication challenges may be similar to the response 114, described herein with respect to FIG. 1. In some embodiments, determining that the response to the one or more authentication challenges matches the user-specific data of the knowledge base may include generating an embedding of the response and/or data of the response, and comparing the embedding to embeddings of the user-specific data within the knowledge base.

Embodiments of the present disclosure integrate the encoding of user-specific data into an automated pipeline that has not been previously possible due to the deficiencies of natural language understanding algorithms. Previously, such algorithms could not generate good candidate responses that match a specific context and could also not effectively recognize the meaning of a phrase given a large enough context. Introducing LLMs as part of the authentication process allows for the integration of effective ways of authentication in an automated fashion that may be continually updated to remain current. Moreover, using this technique as a constant or repeated way to re-authenticate or request additional access based on knowledge of internal systems and protocols, without requiring access to be explicitly granted by a human, also represents an improvement to the operation of computing devices and to the technological field of computer security.

Figure 3:
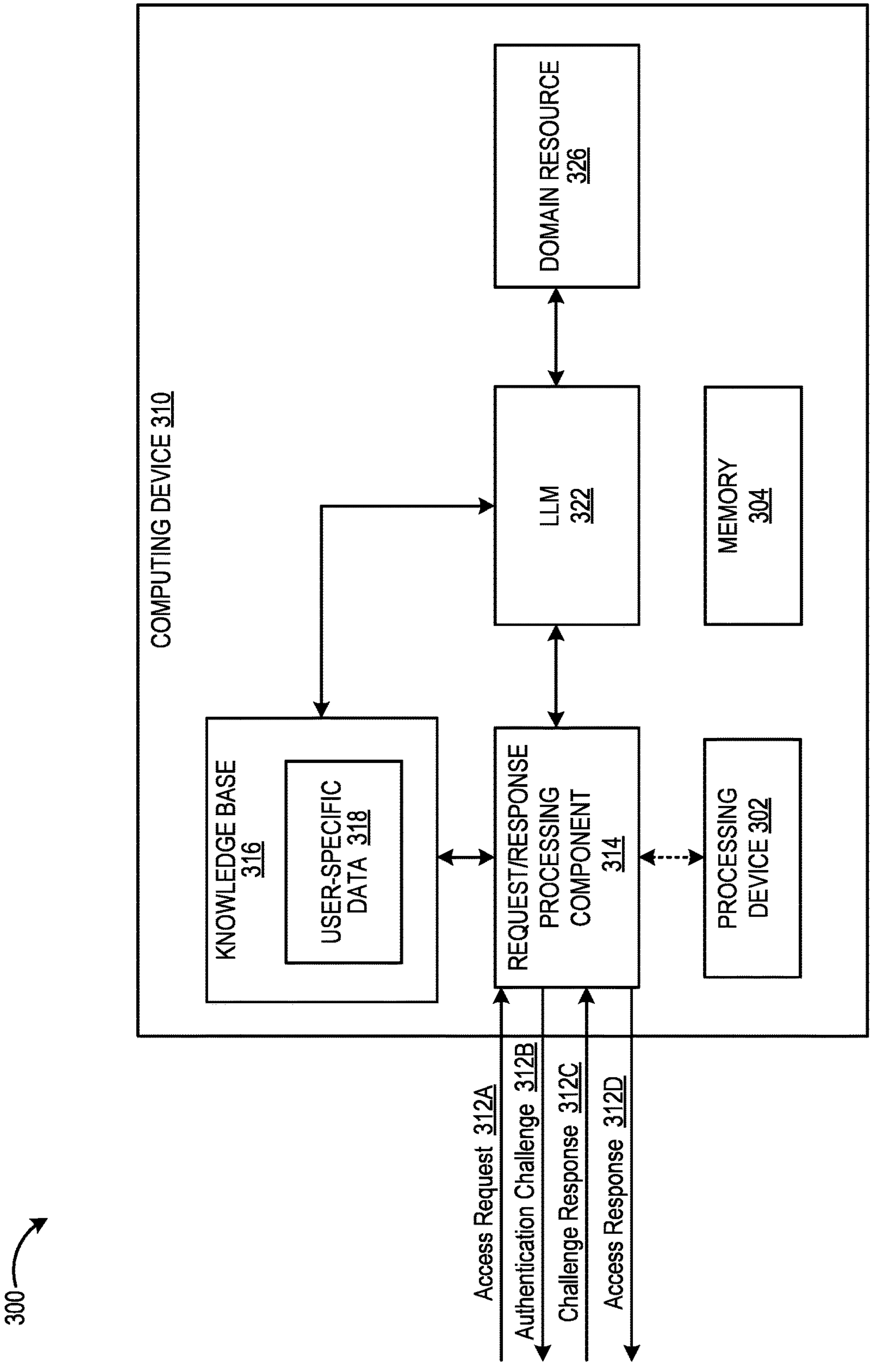
FIG. 3 is a component diagram of an example of a device architecture for LLM-based authentication.

FIG. 3 is a component diagram of an example of a device architecture 300 for LLM-based authentication, in accordance with embodiments of the disclosure. The device architecture 300 includes a computing device 310 having a processing device 302 and memory 304, which may implement the aspects described herein with respect to FIGS. 1 to 2.

Referring to FIG. 3, the computing device 310 may access a knowledge base 316 including user-specific data 318 of a user associated with domain resource 326. In some embodiments, the knowledge base 316 may be similar to the knowledge base 130 described herein with respect to FIG. 1. In some embodiments, the user-specific data 318 may be similar to the data included in the knowledge base 130 as described herein with respect to FIG. 1. In some embodiments, the user device may be similar to the user device 110 described herein with respect to FIG. 1. In some embodiments, the domain resource 326 may be similar to the resources provided by the domain controller 140 as described herein with respect to FIG. 1.

The computing device 310 may include a request/response processing component 314 for communications 312A-312D with the user device. The computing device 310, in response to receiving an access request 312A from the user device for access to the domain resource 326, may generate an authentication challenge 312B based on the user-specific data 318. In some embodiments, the access request 312A may be similar to the request received by the authentication model 120 to access a resource of the domain as described herein with respect to FIG. 1. In some embodiments, the authentication challenge 312B may be similar to the authentication challenge 112 described herein with respect to FIG. 1. The authentication challenge 312B is generated by an LLM 322 trained on the user-specific data 318. In some embodiments, the LLM 322 may be similar to the generative engine 160 described herein with respect to FIG. 1.

The computing device 310 may, in response to determining that a challenge response 312C to the authentication challenge 312B matches the user-specific data 318 of the knowledge base 316, may provide the user device access to the domain resource 326. In some embodiments, the challenge response 312C may be similar to the response 114 described herein with respect to FIG. 1. The computing device 310 may also provide an access response 312D to the user device. In some embodiments, the access response 312 may be similar to the access ticket/session key 142 described herein with respect to FIG. 1.

Figure 4:
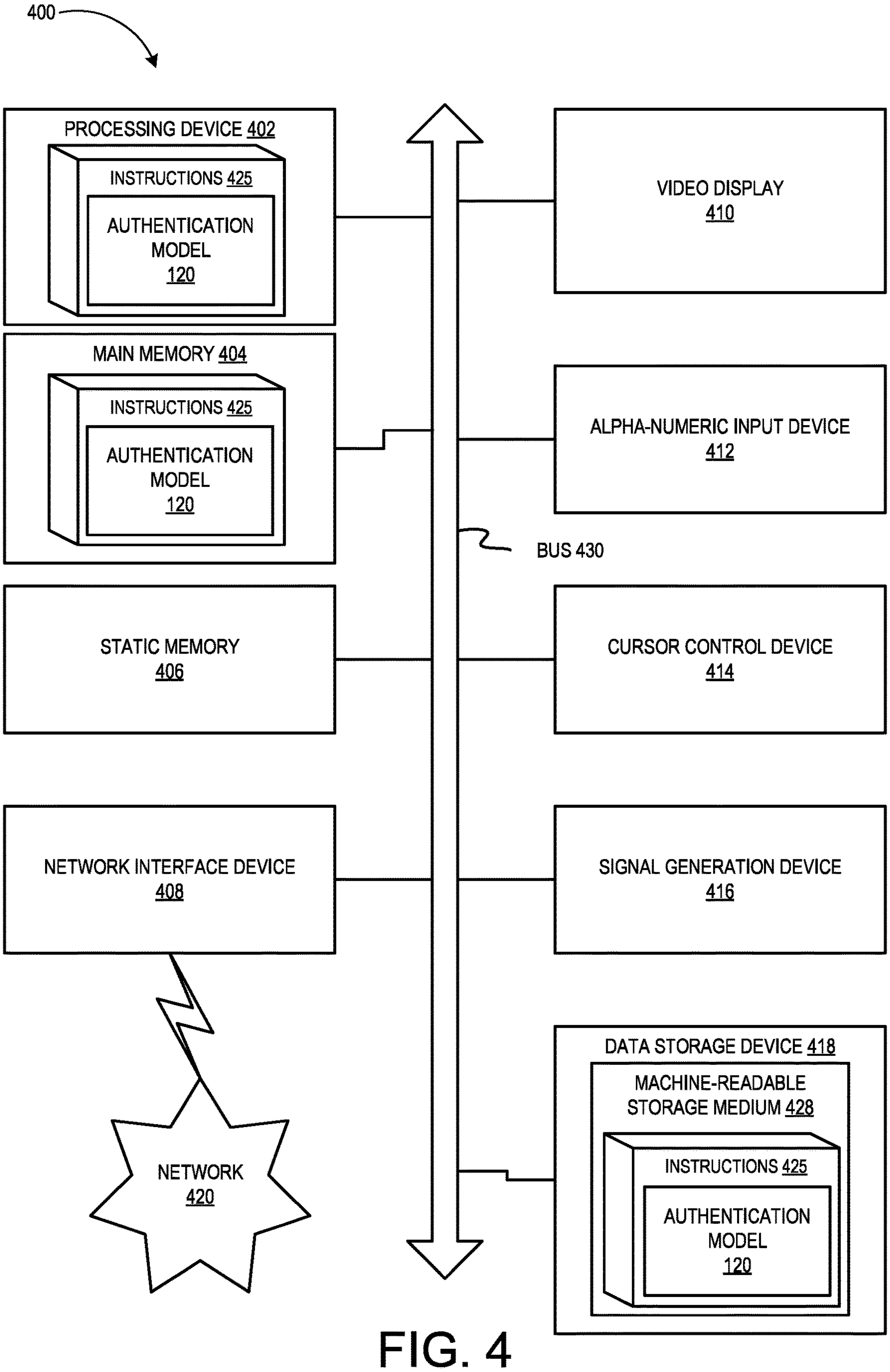
FIG. 4 is a block diagram of an example computing device that may perform one or more of the operations described herein, in accordance with some embodiments of the disclosure.

FIG. 4 is a block diagram of an example computing device 400 that may perform one or more of the operations described herein, in accordance with some embodiments of the disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory) and a data storage device 418, which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may execute the operations described herein, in accordance with one or more aspects of the present disclosure, for performing the operations and steps discussed herein.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for LLM operations, such as authentication model 120, for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "accessing," "generating," "providing," "determining," "receiving," "denying," "comparing," "authenticating," "matching," "transmitting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

accessing a knowledge base comprising user-specific data of a user device associated with a domain;

generating, by a processing device, in response to a request from the user device for access to a resource of the domain, one or more authentication challenges based on the user-specific data, the one or more authentication challenges being generated by a large language model (LLM) trained on the user-specific data and contextual interactions associated with the user device;

in response to determining that a response to the one or more authentication challenges matches the user-specific data of the knowledge base and the contextual interactions, providing the user device access to the resource of the domain, wherein the one or more authentication challenges comprise a conversation including a plurality of authentication challenge interactions with the user device, wherein the determining comprises detecting whether interaction patterns of the user device include an anomaly based on observed context associated with the user device across the plurality of authentication challenge interactions, wherein the determining is performed by the LLM and further comprises identifying whether the user device exhibits interaction patterns that differ from previously observed behavioral characteristics associated with the user, wherein the interaction patterns include at least one of: a deviation in average response time, a deviation in average response length, a deviation in stopword usage, or a deviation in spelling error frequency;

determining, after providing the user device access to the resource of the domain, that the user device is associated with an existing multifactor authentication (MFA) token; and invalidating the existing MFA token associated with the user device.

2. The method of claim 1, further comprising:

providing the one or more authentication challenges to the user device, the one or more authentication challenges being based on the contextual interactions and corresponding to at least one of: a natural language query for the user device, or information associated with the user-specific data of the knowledge base.

3. The method of claim 1, wherein the contextual interactions correspond to at least one of: an authentication fact, an authentication statement, an average response time, an average response length, a number of spelling mistakes, or a stopword pattern.

4. The method of claim 1, further comprising:

receiving, from the user device, the response to the one or more authentication challenges, the response being in a natural language format; and generating a first embedding from the response to map the response to the knowledge base.

5. The method of claim 4, further comprising:

determining, based on the first embedding, whether the response to the one or more authentication challenges matches the user-specific data of the knowledge base with a threshold level of confidence for authentication of the user device.

6. The method of claim 4, wherein in response to determining, based on the first embedding, that the response to the one or more authentication challenges does not match the user-specific data of the knowledge base and the contextual interactions, denying the user device access to the resource of the domain.

7. The method of claim 1, wherein the determining that the response to the one or more authentication challenges matches the user-specific data of the knowledge base, comprises:

comparing a first embedding of the response to a second embedding of the user-specific data.

8. The method of claim 7, wherein the comparing the first embedding to the second embedding, comprises:

determining whether the first embedding of the response is nearest in the knowledge base to the second embedding of the user-specific data.

9. A system comprising:

a processing device; and a memory to store instructions that, when executed by the processing device cause the processing device to:

access a knowledge base comprising user-specific data of a user device associated with a domain;

generate, in response to a request from the user device for access to a resource of the domain, one or more authentication challenges based on the user-specific data, the one or more authentication challenges being generated by a large language model (LLM) trained on the user-specific data and contextual interactions associated with the user device;

in response to a determination that a response to the one or more authentication challenges matches the user-specific data of the knowledge base and the contextual interactions, provide the user device access to the resource of the domain, wherein the one or more authentication challenges comprise a conversation including a plurality of authentication challenge interactions with the user device, wherein the determining comprises detecting whether interaction patterns of the user device include an anomaly based on observed context associated with the user device across the plurality of authentication challenge interactions, wherein the determination is performed by the LLM and further comprises identifying whether the user device exhibits interaction patterns that differ from previously observed behavioral characteristics associated with the user, wherein the interaction patterns include at least one of: a deviation in average response time, a deviation in average response length, a deviation in stopword usage, or a deviation in spelling error frequency;

determine, after providing the user device access to the resource of the domain, that the user device is associated with an existing multifactor authentication (MFA) token; and invalidate the existing MFA token associated with the user device.

10. The system of claim 9, wherein the processing device is further to:

provide the one or more authentication challenges to the user device, the one or more authentication challenges being based on the contextual interactions and corresponding to at least one of: a natural language query for the user device, or information associated with the user-specific data of the knowledge base.

11. The system of claim 9, wherein the contextual interactions correspond to at least one of: an authentication fact, an authentication statement, an average response time, an average response length, a number of spelling mistakes, or a stopword pattern.

12. The system of claim 9, wherein the processing device is further to:

receive, from the user device, the response to the one or more authentication challenges, the response being in a natural language format; and generate a first embedding from the response to map the response to knowledge base.

13. The system of claim 12, wherein the processing device is further to:

determine, based on the first embedding, whether the response to the one or more authentication challenges matches the user-specific data of the knowledge base with a threshold level of confidence for authentication of the user device.

14. The system of claim 12, wherein in response to the determination, based on the first embedding, that the response to the one or more authentication challenges does not match the user-specific data of the knowledge base and the contextual interactions the processing device is further to:

deny the user device access to the resource of the domain.

15. The system of claim 9, wherein to determine that the response to the one or more authentication challenges matches the user-specific data of the knowledge base the processing device is further to:

compare a first embedding of the response to a second embedding of the user-specific data.

16. The system of claim 15, wherein to compare the first embedding to the second embedding the processing device is further to:

determine whether the first embedding of the response is nearest in the knowledge base to the second embedding of the user-specific data.

17. A non-transitory computer readable medium, having instructions stored thereon which, when executed by a processing device, cause the processing device to:

access a knowledge base comprising user-specific data of a user device associated with a domain;

generate, by the processing device, in response to a request from the user device for access to a resource of the domain, one or more authentication challenges based on the user-specific data, the one or more authentication challenges being generated by a large language model (LLM) trained on the user-specific data and contextual interactions associated with the user device; and in response to a determination that a response to the one or more authentication challenges matches the user-specific data of the knowledge base and the contextual interactions, provide the user device access to the resource of the domain, wherein the one or more authentication challenges comprise a conversation including a plurality of authentication challenge interactions with the user device, wherein the determining comprises detecting whether interaction patterns of the user device include an anomaly based on observed context associated with the user device across the plurality of authentication challenge interactions, wherein the determination is performed by the LLM and further comprises identifying whether the user device exhibits interaction patterns that differ from previously observed behavioral characteristics associated with the user, wherein the interaction patterns include at least one of: a deviation in average response time, a deviation in average response length, a deviation in stopword usage, or a deviation in spelling error frequency;

determine, after providing the user device access to the resource of the domain, that the user device is associated with an existing multifactor authentication (MFA) token; and invalidate the existing MFA token associated with the user device.

18. The non-transitory computer-readable storage medium of claim 17, wherein the contextual interactions correspond to at least one of: an authentication fact, an authentication statement, an average response time, an average response length, a number of spelling mistakes, or a stopword pattern.

19. The non-transitory computer-readable storage medium of claim 17, wherein to determine that the response to the one or more authentication challenges matches the user-specific data of the knowledge base the processing device is further to:

compare a first embedding of the response to a second embedding of the user-specific data.

20. The non-transitory computer-readable storage medium of claim 19, wherein to compare the first embedding to the second embedding the processing device is further to:

determine whether the first embedding of the response is nearest in the knowledge base to the second embedding of the user-specific data.

* * * * *